US012135011B1

(12) United States Patent
O'Malley (10) Patent No.: US 12,135,011 B1
(45) Date of Patent: Nov. 5, 2024

(54) FLOW CONVERSION TURBINES AND ASSEMBLIES

(71) Applicant: Michael O'Malley, New Bedford, MA (US)

(72) Inventor: Michael O'Malley, New Bedford, MA (US)

( * ) Notice: Subject to any disclaimer, the term of this patent is extended or adjusted under 35 U.S.C. 154(b) by 0 days.

(21) Appl. No.: 18/605,083

(22) Filed: Mar. 14, 2024

(51) Int. Cl.
*F03D 3/06* (2006.01)
*F03D 3/02* (2006.01)
*F03D 9/25* (2016.01)

(52) U.S. Cl.
CPC ............. *F03D 3/066* (2023.08); *F03D 3/02* (2013.01); *F03D 9/25* (2016.05); *F05B 2220/706* (2013.01); *F05B 2240/372* (2020.08)

(58) Field of Classification Search
CPC . F03D 3/002; F03D 3/005; F03D 3/02; F03D 3/06; F03D 3/066; F03D 3/067; F05B 2240/372
See application file for complete search history.

(56) References Cited

U.S. PATENT DOCUMENTS

| | | | |
|---|---|---|---|
| 4,004,861 A * | 1/1977 | Soules | F03D 3/067 416/41 |
| 4,069,669 A | 1/1978 | Pitkanen | |
| 9,309,861 B1 | 4/2016 | Gaul et al. | |
| 10,294,913 B2 | 5/2019 | Schurtenberger | |
| 2014/0265335 A1 | 9/2014 | Andreis et al. | |
| 2015/0086366 A1 | 3/2015 | Barnes et al. | |
| 2017/0130716 A1 | 5/2017 | Akmandor | |
| 2022/0299004 A1 | 9/2022 | Dolenc | |

FOREIGN PATENT DOCUMENTS

FR 2511437 A1 2/1983

* cited by examiner

*Primary Examiner* — Christopher R Legendre
(74) *Attorney, Agent, or Firm* — Maier & Maier, PLLC (57) ABSTRACT

A double turbine, includes: a rotatable deflector disc including a first base plate and a second base plate facing opposing directions along an axis of rotation; a first plural number of first vanes each pivotally mounted on the first base plate and uniformly spaced around the axis of rotation by a vane spacing angle; a second plural number of second vanes each pivotally mounted on the second base plate, and uniformly spaced around the axis of rotation by the vane spacing angle, the second plural number being equivalent to the first plural number; wherein each first vane is angularly positioned with respect to the rotation axis as between two second vanes. Multiple such double turbines can be stacked with a progressive helical twist such that each one double turbine is offset from at least one adjacent double turbine by a common twist angle with respect to the axis of rotation.

19 Claims, 8 Drawing Sheets

FLOW CONVERSION TURBINES AND ASSEMBLIES

TECHNICAL FIELD

The present disclosure relates to energy conversion systems and devices, and more particularly, the present disclosure relates to conversion systems and devices for use in fluid flows such as ocean water, other tide affected waters, and wherever persistent, predictable, and/or ebb and flow fluid movement is available. One embodiment of the device may also be used as a mini-hydro cross flow turbine in streams and rivers.

BACKGROUND

Typical machines providing kinetic energy conversion from fluid flow, e.g. of swinging-flap type, "run-of-river," and "ultra-low head" devices operate by rotation or vanes or other flow engagement elements as relative motion between fluid and the vanes occurs. Vane movement is typically at a right angle relative to a flow, which provides a mechanical inefficiency in energy conversion at the initial mechanical stage, even before further conversion, such as kinetic-to-electric conversion occurs.

Energy conversion systems are being developed for use as predictable ocean energy source using stable tidal current, for use in estuaries collecting power from ebb and flow, and for use in streams and canals capturing the power of current without harming the flora or fauna.

Environmental fluid flows are emerging as good alternative energy sources for reducing the use of fossil fuels while responding to the Convention on Climate Change through reduction of greenhouse gases (GHG). Natural tidal phenomena can be predicted in the long term and the great advantage of tidal turbine development is that unlike other renewable energies, it can operate on a more predictable and consistent pattern regardless of day or night, seasonal factors, weather or if the wind is blowing. The energy can be stored in solid-state batteries or converted by the latest electrolysis methods to produce green hydrogen and oxygen or can be saved in a pumped hydro reservoir setup to drive a generator at peak time. On islands and in remote communities there are dependencies on fossil fuel based local energy generation and/or power delivered from afar through a power cable. Those communities could be producing a large part of their own energy with tidal energies if more viable technology was available to them, and they could be exporting power to the mainland through a cable as renewable Blue Energy.

With a total installed tidal power capacity of 511 MW, South Korea is leading the way globally, according to the information provided by National Energy Board of Canada. South Korea is followed by France with 246 MW, and the United Kingdom with 139 MW, as of Aug. 19, 2016. It's time the USA leads in this technology and exports it rather than importing fossil fuels and lagging other countries in using clean energy.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

A double turbine, according to at least one embodiment, includes: a rotatable deflector disc including a first base plate and a second base plate facing opposing directions along an axis of rotation; a first plural number of first vanes each pivotally mounted on the first base plate and uniformly spaced around the axis of rotation by a vane spacing angle; a second plural number of second vanes each pivotally mounted on the second base plate, and uniformly spaced around the axis of rotation by the vane spacing angle, the second plural number being equivalent to the first plural number; wherein each first vane is angularly positioned with respect to the rotation axis as between two second vanes.

Each first vane may be angularly positioned with respect to the rotation axis as half way between two nearest second vanes.

Each first vane may be angularly spaced with respect to the rotation axis relative to at least one nearest second vane by a baseplate offset angle.

The baseplate offset angle may be approximately equivalent to one half of the vane spacing angle.

Each first vane may freely pivot relative to the first base plate, and each second vane freely pivots relative to the second base plate.

Each first vane may freely pivot along a respective vane axis non-parallel to the axis of rotation, and each second vane freely pivots along a respective vane axis non-parallel to the axis of rotation.

Each first vane may freely pivot along a respective vane axis perpendicular to the axis of rotation, and each second vane freely pivots along a respective vane axis non-parallel to the axis of rotation.

In some examples, each vane axis is perpendicular to and offset from the axis of rotation.

Each said vane axis may be prograde positioned and retrograde rotated relative to a respective radial line through the axis of rotation.

In some examples, each first vane pivots between the first base plate and an acute raised angle therefrom; and each second vane pivots between the second base plate and an acute raised angle therefrom.

Each first vane may have a cupped aft face directed opposite the direction of rotation when raised; each second vane may have a cupped aft face directed opposite the direction of rotation when raised.

A conversion assembly, according to at least one embodiment, includes a particular number of double turbines arranged along a shared axis of rotation, each one double turbine respectively including: a rotatable deflector disc including a first base plate and a second base plate facing opposing directions along an axis of rotation; a first plural number of first vanes each pivotally mounted on the first base plate and uniformly spaced around the axis of rotation by a vane spacing angle; a second plural number of second vanes each pivotally mounted on the second base plate, and uniformly spaced around the axis of rotation by the vane spacing angle, the second plural number being equivalent to the first plural number. Each first vane is angularly positioned with respect to the rotation axis as between two second vanes. The multiple double turbines are arranged with a progressive helical twist such that each one double turbine is offset from at least one adjacent double turbine by a common twist angle with respect to the axis of rotation.

Within each one double turbine, each first vane may be angularly positioned with respect to the rotation axis as half way between two nearest second vanes.

Within each one double turbine, each first vane may be angularly spaced with respect to the rotation axis relative to at least one nearest second vane by a baseplate offset angle.

Each one double turbine of the particular number of double turbines can have approximately the same baseplate offset angle.

The common twist angle can be approximately equivalent to the baseplate offset angle divided by the particular number.

Each double turbine can have the same number of first vanes and second vanes as each other double turbine such that each double turbine has the same vane spacing angle.

The baseplate offset angle can be approximately equivalent to one half of the vane spacing angle.

A conversion assembly, according to at least one embodiment, includes multiple stacks of double turbines, each stack including the particular number of double turbines according to the above.

The above summary is to be understood as cumulative and inclusive. The above and below described features are to be understood as combined in whole or in part in various embodiments whether expressly described herein or implied by at least this reference. For brevity, not all features are expressly described and illustrated as combined with all other features. No combination of features shall be deemed unsupported for merely not appearing expressly in the drawings and descriptions.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTIONS

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Any materials described are provided as non-limiting examples except where their inclusion is positively and unambiguously asserted. Once materials and arrangements are described herein with reference to any structures and elements thereof, for example in the drawings, such descriptions apply as well to any further same or similar structures and elements that may appear in other drawings.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains.

These descriptions and drawings detail embodiments of systems and devices that use a Helical Applied Power Principle of placing the torque distribution to the shaft and bearings at different times and angles to lessen the amount of wear and flexion to the bearings and shaft.

In various embodiments, a turbine takes the velocity/density of a fluid in a flow from any direction and transfers the linear kinetic force into a rotational movement of a shaft, to drive a gear train that turns an apparatus that would otherwise be driven by a motor. The axis of the shafts can be arranged to work either vertically or horizontally.

In some embodiments, imparted rotational movement can be used to turn a scroll air blower for aeration in a bubble curtain, or a pump to move fluid, or to turn a generator creating power but is not limited to these examples.

It is to be understood that both the foregoing general description and the following detailed description of the present invention are exemplary and explanatory and are intended to be exemplary and explanatory only and are not to be construed as limiting the scope of the inventive concept. It is obvious that it is included in the technical idea of the present invention.

Embodiments of vaned turbines for converting fluid flow movement at least into rotational mechanical energy are described in the following. A fixed elevated vane perpendicular to a fluid flow does not capture the full force of passing fluid, as most of the fluid flows around and past such a vane letting the true energy escape. The turbines described in the following use a disc as a working platform and variably elevated vanes, with vortex cones arranged so that, at the very beginning and during the rotational cycle, the vanes deploy by elevating to raised positions between the disc and the vortex cone and trap the full force of the fluid flow to rotate the turbine. This greatly adds to the capture of the kinetic energy and when the disc rotates and the vanes approach the flow in retrograde, the vanes stow by folding flat so as to not produce an opposing force into the flow.

In any given flow, such a vane may produce power for a limited range of its rotation, and the turbine therefore produces along that limited range as the vanes travel, for example 140 degrees. A diversion shield in some below described embodiments captures the flow first, and increases the production range of rotation, for example to greater than 175 degrees.

By having mirrored vanes on opposing sides of the working platform, the amount of force directed to rotational movement is doubled. This can be used to produce current by driving a generator. A helical twist among turbines helps to reduce the adverse effect of torque ripples, and levelizes the force of a flow evenly. This can greatly reduce the gauge and length of the copper used and reduce the size and weight of magnets reducing the cost/weight of a nacelle and cost of generator. This also addresses the force needed to overcome the magnetic torque to start a generator to spin.

Figure 1:
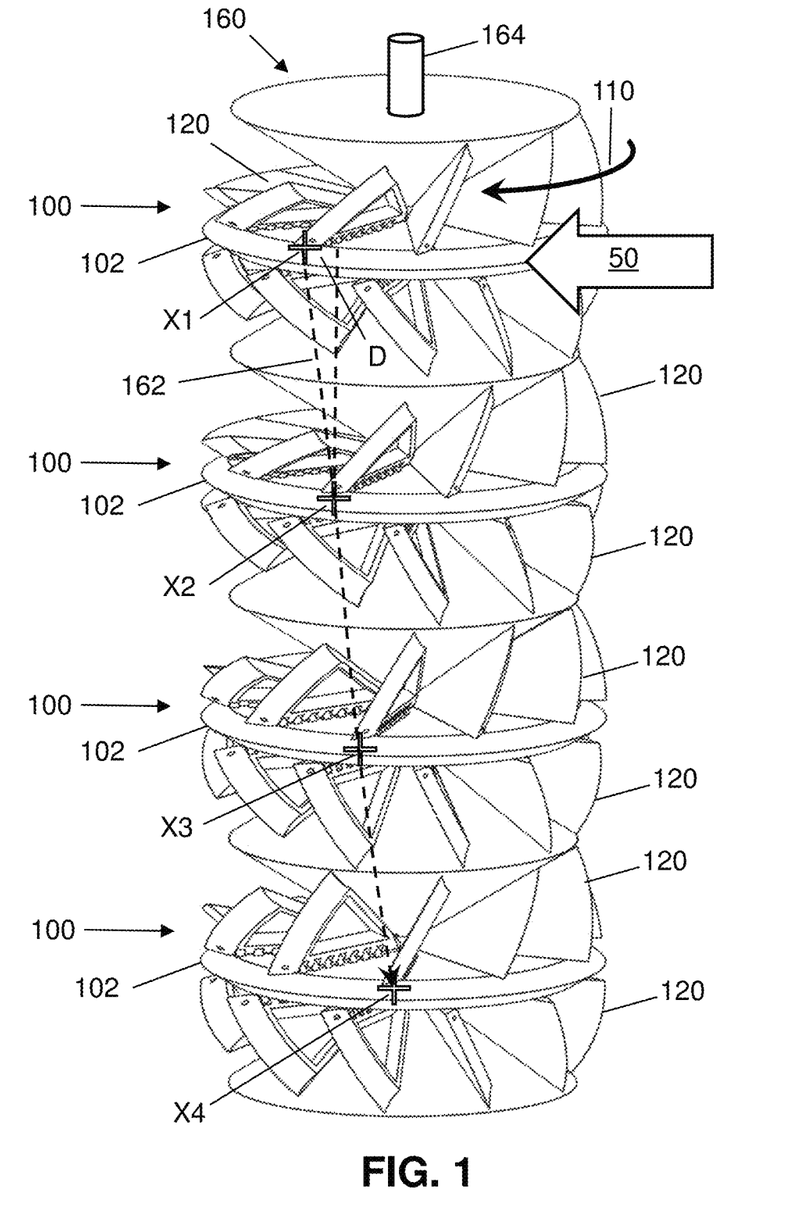
FIG. 1 is a perspective view of an HRV flow conversion assembly of stacked double turbines according to at least one embodiment.
Figure 2:
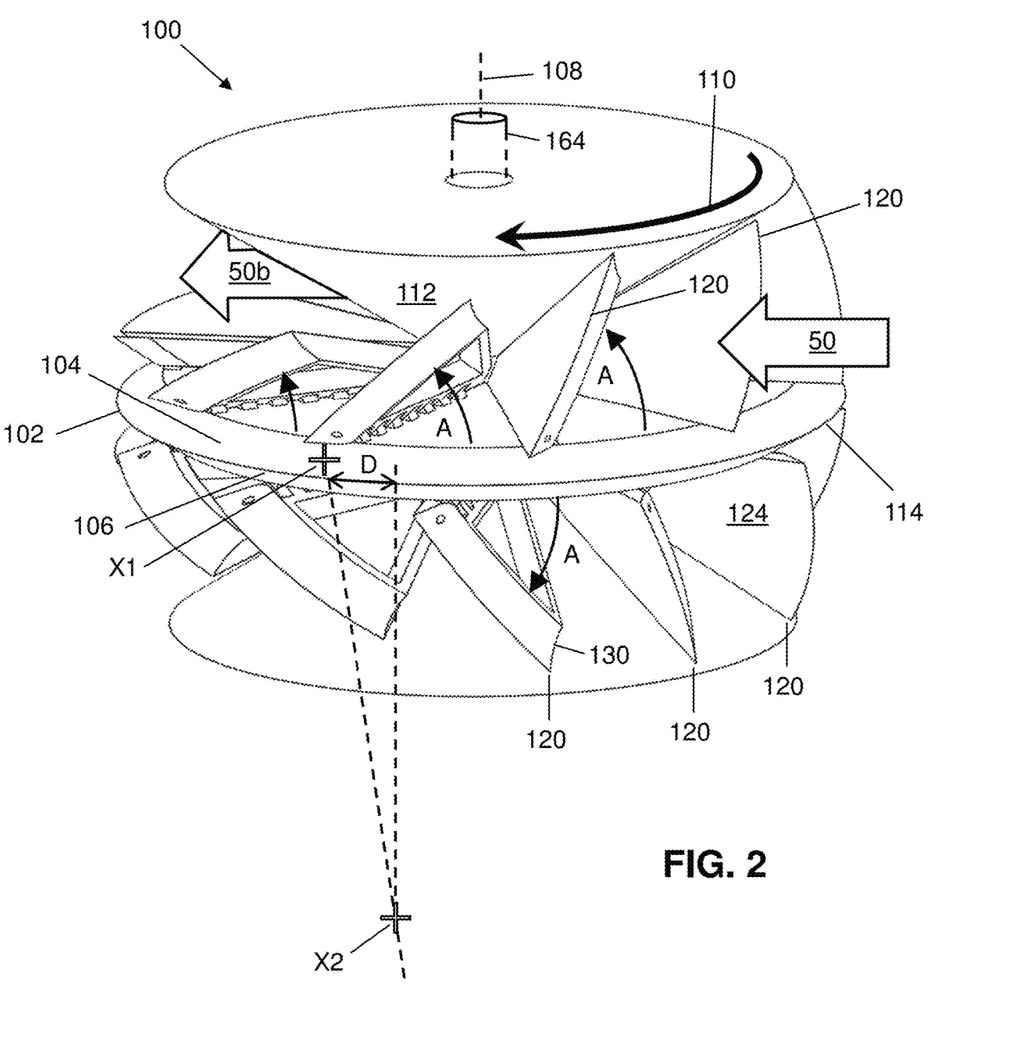
FIG. 2 is a perspective view of an exemplary double turbine of FIG. 1, having twenty vanes: ten first vanes mounted on a first side of a deflector disc; and ten second vanes mounted on an opposite second side of the deflector disc.
Figure 3A:
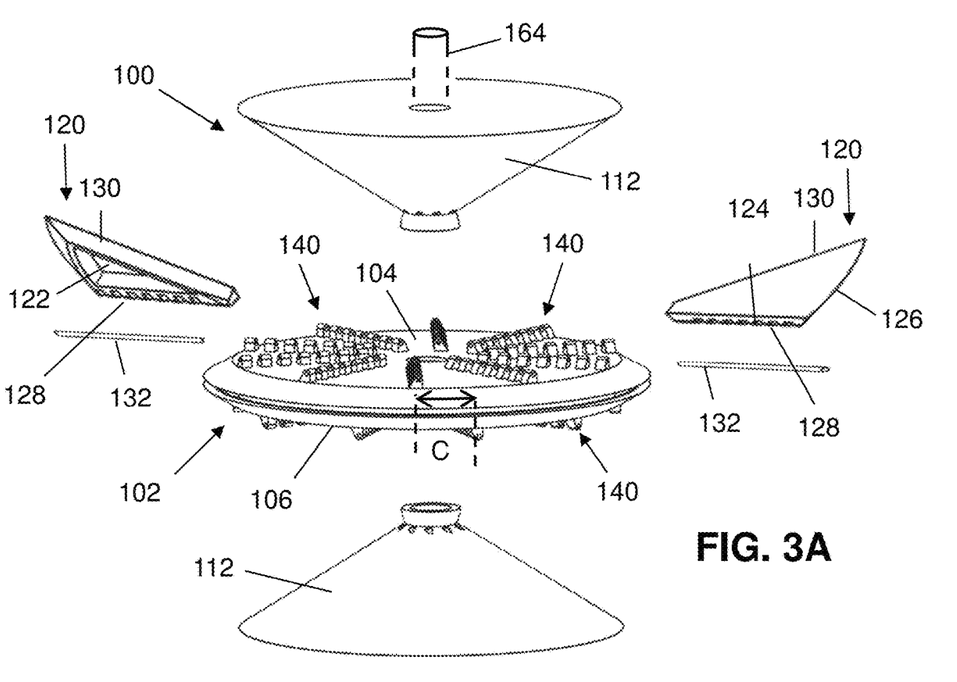
FIG. 3A is an exploded perspective view of the double turbine of FIG. 1, showing only two first vanes thereof for clarity of view.

The following describes a helical rotating vane (HRV) double turbine 100, embodiments of which are illustrated in the drawings, with particular reference to FIGS. 1-2, and FIG. 3A showing a double turbine 100 in part in exploded view. Each double turbine 100 includes a rotatable deflector 102 disc flanked by vane arrays. The rotatable deflector disc 102 is defined by two base plates 104 and 106 facing opposing directions with respect to the axis of rotation 108. The base plates 104 and 106 are shown as slightly spaced in FIG. 3A. Each base plate (104, 106) has a beveled edge at its circular periphery, and their junction defines a wedge as a dividing edge of the deflector disc 102 that separates fluid flow into respective flows on opposing sides of the deflector disc 102 to engage opposing vanes on the two base plates. The double turbine 100 has a natural direction of rotation 110 due to the variable pitch vanes.

A vane 120 according to at least one embodiment is shown in various views in FIGS. 4A-4H. These illustrations correspond to the vanes of the top-illustrated base plate 104 in FIGS. 2-3B for preferential movement to effect rotation in the illustrated natural direction 110. The vanes mounted on either side of the deflector disc 102 are mirror copies of the vanes on the other side by form. Thus, a single illustration of the aft side 122 of a vane (FIG. 4J) corresponding to the bottom-illustrated base plate 106 in conjunction with following descriptions is sufficient. Both top-side and bottom-side vanes are referenced in the drawings as vanes 120 without ambiguity in view of these descriptions.

Each vane pivots variably at its mounted edge on a vane axis defined by its respective pivot mount 140, pivoting between its base plate (104, 106) and a vortex cone 112 (FIGS. 2, 3A), two of which are arranged symmetrically on opposing sides of the deflector disc 102. Each vortex cone 112 narrows from its end distal the deflector disc to its proximal end. A respective channel is defined between each vortex cone 112 and associated base plate (104, 106), the channel narrowing toward the axis of rotation according to the narrowing vortex cone 112. Each base plate (104, 106), the vanes 120 mounted thereon, and the respective vortex cone 112, together mounted on the axle 164 or otherwise coupled, constitute a single turbine. The two single turbines assembled together, mounted on the axle 164 or otherwise coupled to rotate together, define a double turbine 100. The deflector disc is fixed or coupled to the axle 164 to effect rotation of the axle upon rotation of the disk. Thus, rotation of the double turbine 100, rotates the axle.

A respective portion of encountered flow 50 separated by a wedge 114 (FIG. 2) defined by the beveled periphery edges of the base plates 104 and 106 is directed into each channel, where vanes 120 positioned in the channel engage the flow portion. Each vane 120 can pivot in its channel from a stowed flat position against its base plate (104, 106) to various deployed raised positions to engage the flow portion in the channel, causing rotation of the deflector disc 102. A variable pitch angle A is defined between each vane 120 and its base plate as the vane pivots. In absence of outside forces applied, for example by differential pressure effects upon two opposing faces of the vanes, each vane freely pivots independently.

Each vane 120 has a cupped aft face 122 (FIG. 3A) upon which the flow portion applies pressure that causes movement of the vane in a natural direction of movement and consequent rotation of the deflector disc 102 in the natural direction of rotation 110 (FIGS. 1-2). The mirror oppositely formed vanes 120 on opposing sides of the deflector disc 102 pivot from their mirror opposite base plate (104, 106) similarly to have a same effect on defining the natural direction of rotation 110. On either side of the deflector disc, the aft face of any raised vane is generally directed opposite the natural direction of rotation 110.

The face opposite the aft face 122 is termed here as the leading face 124 with respect to the natural direction of movement of the vane 120 as pressure from the fluid flow bears upon the raised aft face 122. A pie-shaped or triangular form of vane 120 is seen in the plan views of FIGS. 4A-4B for example. The vane 120 has a narrow end directed generally radially inward when mounted, and an opposite arcuate outward end 126. Two diverging edges, a pivot edge 128 a free edge 130, extend from the inward to the outward end. The vane 120 is pivotally mounted on a base plate (104, 106) by its pivot edge. The free edge has a curved face that preferentially catches fluid flow to pivot the vane 120 away from the deflector disc 102, increasing the pitch angle A for increased engagement. A maximum acute pitch angle is defined by contact of the free edge in its fully raised position with the vortex cone 112 and/or by cam stop, mechanical jam, or other stopping arrangement at the pivot end according to the particular embodiment of the pivotal mounting of the vane 120 on its base plate (104, 106).

As represented in FIG. 2, the vanes 120 pivotally rise from their base plates to capture fluid flow energy and thereby rotate the deflector disc 102 as fluid pressure bears upon the aft face 122. As each vane 120 returns in its rotation approaching retrograde movement in the fluid flow 50b, reversing its direction in the flow, it naturally folds down to its base plate (104, 106) due to fluid pressure bearing upon its leading face 124 thereby reducing drag and serving higher energy conversion efficiency.

In the illustrated embodiment of the base plates (104, 106) the pivotal mounting is embodied by linear pivot mounts 140, each attached to or a part of its base plate. Each pivot mount 140 has linearly spaced loops for receiving a hinge pin 132 (FIG. 3A). The pivot edges of the vanes 102 are similarly formed, having linearly spaced loops that interdigitate with the loops of the base plate pivot mounts 140, and the pin 132 is received through the vane loops and the base plate loops to pivotally attach the vanes to the base plate (104, 106) in a hinge arrangement. The pivot mounts 140 provide uniformly spaced mounting positions for the vanes that turn the disc 102 when subjected to fluid flow.

Figure 3B:
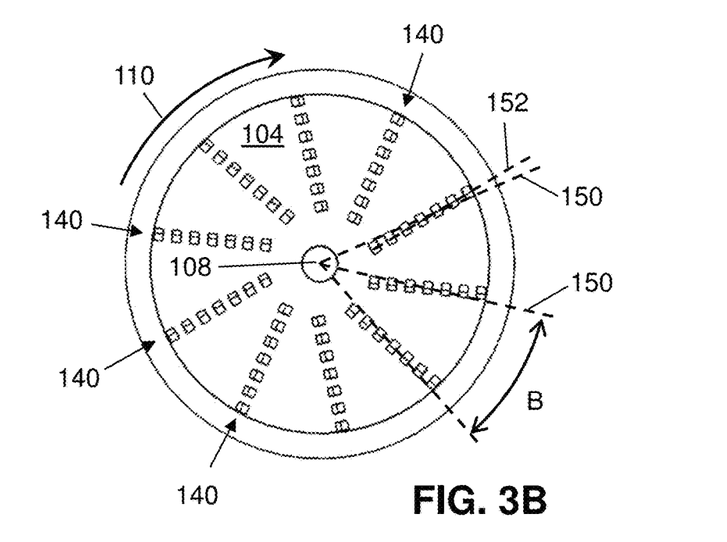
FIG. 3B is a plan view of the top-illustrated first base plate of FIG. 3A, showing the pivot mount arrangement according to at least one embodiment.
Figure 4A:
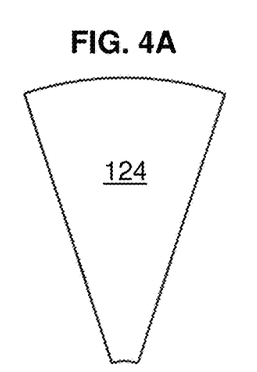
FIG. 4A is a plan view of a first vane of the double turbine of FIG. 1, showing the leading face thereof.
Figure 4B:
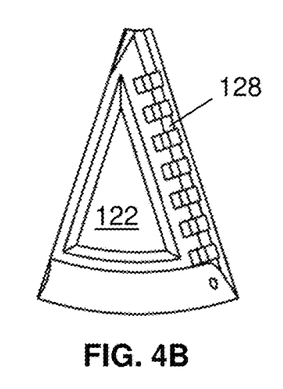
FIG. 4B is a plan view of the first vane of FIG. 4A, showing the aft face opposite the leading face.
Figure 4C:
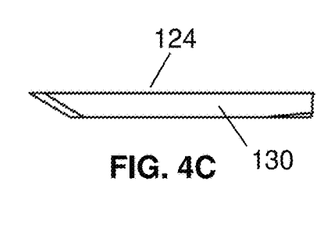
FIG. 4C is an elevation view of the first vane of FIG. 4A, showing the free edge thereof.
Figure 4D:
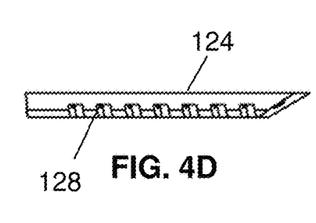
FIG. 4D is an elevation view of the first vane of FIG. 4A, showing the pivot edge opposite the free edge.
Figure 4E:
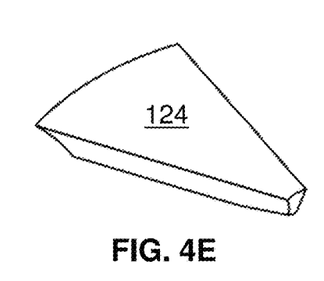
FIG. 4E is a perspective view of the first vane of FIG. 4A, showing the leading face and free edge.
Figure 4F:
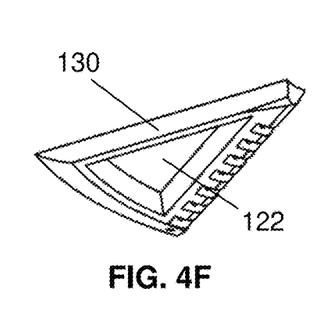
FIG. 4F is a perspective view of the first vane of FIG. 4A, showing the aft face and pivot edge.
Figure 4G:
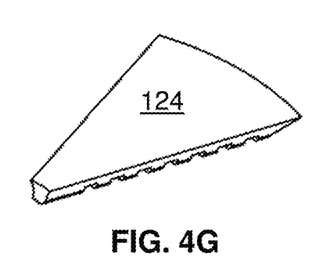
FIG. 4G is a perspective view of the first vane of FIG. 4A, showing the leading face and pivot edge.
Figure 4H:
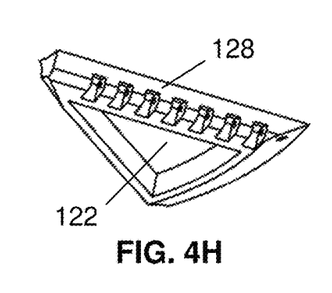
FIG. 4H is a perspective view of the first vane of FIG. 4A, showing the aft face and pivot edge.
Figure 4I:
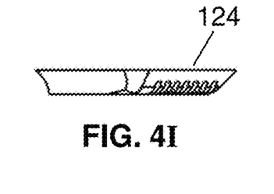
FIG. 4I is an elevation view of the first vane of FIG. 4A, showing the narrow radially inward end.
Figure 4J:
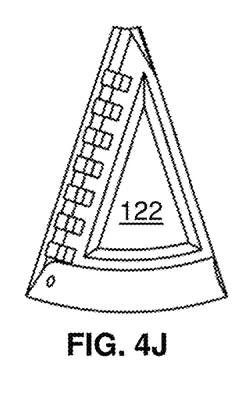
FIG. 4J is a plan view of a second vane of the double turbine of FIG. 1, showing the aft face opposite the leading face for comparison to FIG. 4B, a mirror opposite.

As shown in FIG. 3B, the linear pivot mounts 140 diverge from their ends proximal the center of rotation defining pie-shaped or approximately triangularly spaces between the pivot mounts along the base plate 104 to receive the vanes in their flat positions. The linear pivot mounts extend at least radially in part with respect to the axis of rotation, such that the vanes pivot along vane axes that are non-parallel to the axis of rotation. In the illustrated embodiment, the linear pivot mounts 140 are mounted on planar base plates (104, 106) that are perpendicular to the axis of rotation 108, such that the vanes pivot along vane axes that are perpendicular to the axis 108.

Furthermore, with respect to natural direction of rotation 110, the linear pivot mounts 140 are prograde positioned and retrograde rotated relative to radial lines 150 through the center of rotation. Lines 152 defining the vane axes along the pivot mounts 140 thus extend ahead of the center and trail slightly reverse. Thus, in the illustrated embodiment, the vanes pivot freely on vane axes that are perpendicular to and offset from the axis of rotation. This better arranges the vanes to capture fluid flow, and across a wider range of rotation, than radial line alignment.

A respective arrangement of pivot mounts 140 is positioned on and carried by each base plate (104, 106) of the deflector disc 102. With reference to a first side, defined by base plate 104 of the rotatable deflector disc 102, first pivot mounts 140 are uniformly spaced by a vane spacing angle B (FIG. 3B). Similarly, second pivot mounts are uniformly spaced by a same vane spacing angle (vane to vane angle B) on the second side (defined by base plate 106) of the deflector disc 102 opposite the first side.

The vanes 120 mounted on either side of the deflector disc 102 are mirror copies of the vanes 120 on the other side by form but not by arrangement, which is due to a base plate offset angle. In the double turbines 100 of FIGS. 1-2, the arrangement on one side of the deflector disc 102 is offset angularly from the other by a base plate offset angle C (FIG. 3A). This provides staggered pivot mounts on opposing sides of the deflector disc 102, each pivot mount on either base plate (104, 106) being disposed offset from nearest pivot mounts on the other base plate across the deflector disc 102 so that vanes 120 on one side of the disc are angularly positioned with respect to the rotation axis as between two opposing vanes 120 on the other side. By advantageously selecting the base plate offset angle C as half of the vane spacing angle B, the vanes 120 on one side of the disc are angularly positioned with respect to the rotation axis as half way between two nearest opposing vanes 120 on the other side, the effects of "torque ripple" are at least in part minimized, particularly in synergistic benefit with a progressive helical twist among the stacked double turbines 100 in a conversion assembly having a helical twist trend curve 162 as represented in FIG. 1 defined a twist angle D between adjacent double turbines 100 as described below.

Thus, with N first vanes 120 on a first base plate 104 being uniformly spaced, the vane spacing angle is defined as B=(360 degrees)/N. For a deflector plate having N second vanes 120 on a second base plate 106 opposite the first, the vane spacing angle is same defined. For the second vanes to be halfway offset from first vanes, the base plate offset angle is defined as C=B/2.

In the example of a 10-vane set-up on a first base plate as in the drawings, the vane axes are spaced by a vane spacing angle B=36° by the pivot mounts (360°/10). On the opposite second base plate of the same deflector disc 102, the vanes are similarly spaced from each other by the same vane spacing angle, and offset from the vanes of the opposite base plate by a base plate offset angle C=18° (½ of 36°).

A flow conversion assembly of stacked double turbines 100 can be arranged by stacking aligned double turbines in a common rotation orientation, for example along a common axle 164, such that their natural directions of rotation 110 are the same. Multiple similar or same double turbines 100 are shown for example in the flow conversion assembly 160 of FIG. 1, in which four double turbines (M=4) are included in the expressly illustrated embodiment. Other embodiments of flow conversion assemblies within the scope of these descriptions can have more or less double turbines.

On each base plate, N vanes 120 are spaced by the vane spacing angle B=(360 degrees)/N, and in each double turbine 100, the two base plates and their vane arrangements therewith, are offset by the base plate offset angle C=B/2.

Furthermore, the illustrated flow conversion assemblies are arranged with a progressive helical twist among the stacked double turbines 100. As best illustrated by way of index markers in FIG. 1, in which index markers X1, X2, X3 and X4 mark same positions on respective deflector discs 102, each double turbine 100 is angularly offset from an adjacent double turbine 100, the offset accumulating from turbine to turbine uniformly and progressively from either end of the assembly to the other. This ensures that the force from the liquid flow is evenly distributed in a helical form along the shaft axis and limits torque ripple and flexion to a minimum.

For illustration of this principle, a helical twist trend curve 162 is represented along the index markers in FIGS. 1 and 2 for illustration. The helical twist offset from one double turbine 100 to a next in a stack of M double turbines is defined as a twist angle D=B/M, or equivalently D=((360 degrees)/N)/M. The angle D is illustrated in enlarged view in FIG. 2, showing the relative twist angle D between any two adjacent double turbines as projected onto the deflector disc 102 of the illustrated double turbine 100. Thus, the helical twist along the assembly progresses toward the vane spacing angle B in increments according to the number M of double turbines 100. Thus, in an example where two assemblies as in FIG. 1 are stacked end to end, the first double assemblies would align.

In the example of FIG. 1, each double turbine 100 has a respective ten (N=10) vanes on opposing sides of its deflector disc 102, and thus a base plate offset angle C=18 degrees. The illustrated HRV flow conversion assembly has four (M=4) stacked double turbines 100, and thus a helical twist angle D=4.5 degrees.

In another example, in which similarly each base plate has ten (N=10) vanes, and an HRV flow conversion assembly has three (M=3) stacked double turbines 100, the base plate offset angle at each double turbine remains as C=18 degrees, and the helical twist angle is adjusted to D=6 degrees.

Figure 5:
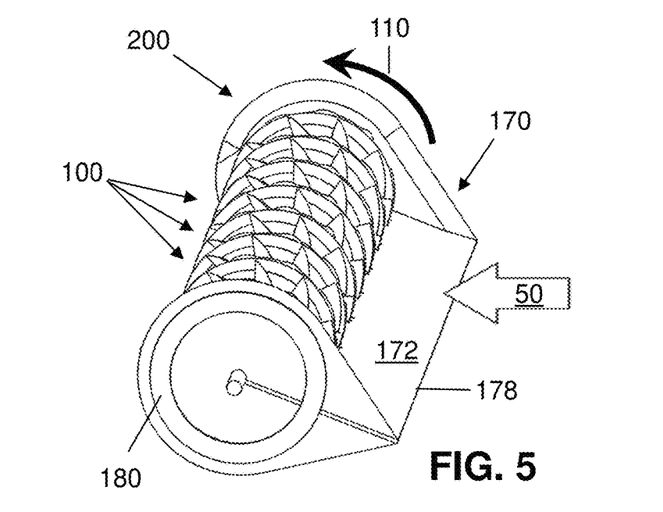
FIG. 5 is a perspective view of a shrouded flow conversion assembly, according to at least one embodiment, having the stacked double turbines of FIG. 1 and a flow efficient diversion shield, taken from a perspective to show the flow-prograde sides of the rotating turbine stack.

FIG. 5 is a perspective view of a shrouded flow conversion assembly 200, according to at least one embodiment, having eight stacked double turbines 100 of FIG. 2 and a flow efficient diversion shield 170. As non-limiting examples of utility, applying to all embodiments herein, mechanical linkage 212 (FIG. 6) can convey rotational mechanical energy from a common axle 164 to do work, and/or the axle can drive an on-board electrical power generator 210, and/or each double turbine 100 can have a respective electric power-generating element 214.

The diversion shield 170 guides the oncoming flow into engagement with the flow-prograde sides of the rotating turbine stacks to maximize engagement, while diverting flow away from or around the flow-retrograde sides to minimize drag and turbine rotation resistance. The diversion shield has a guide plate 172 that guides the flow, and a support brace 176 that spans two opposing end bracket plates 180 that mount the axle 164 to support the stacked double turbines 100.

Figure 6:
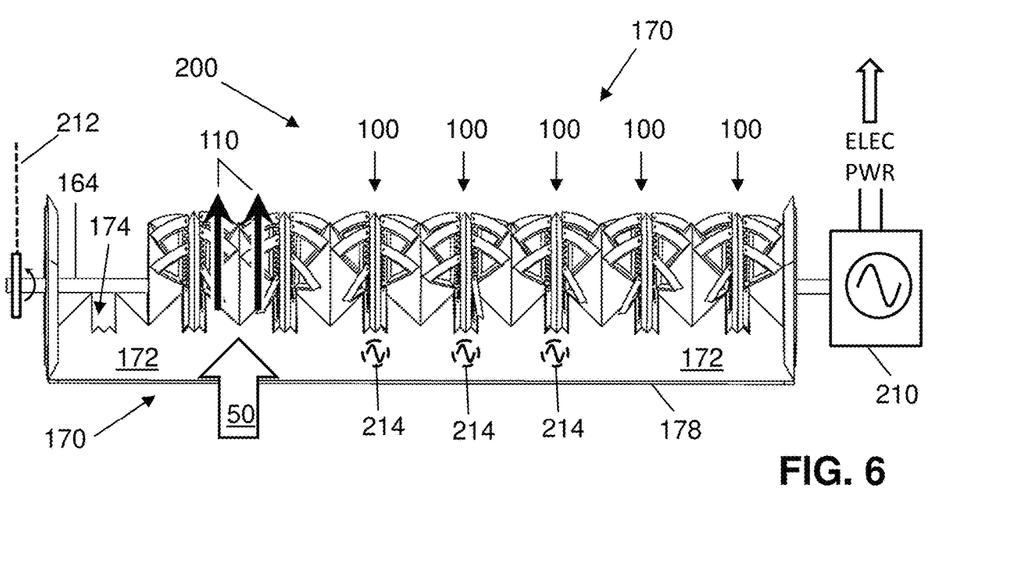
FIG. 6 is an elevation view of the shrouded flow conversion assembly of FIG. 5, shown with a double turbine removed for clear illustration of at least the associated notch through the radially inward edge of the guide plate of the diversion shield.
Figure 7:
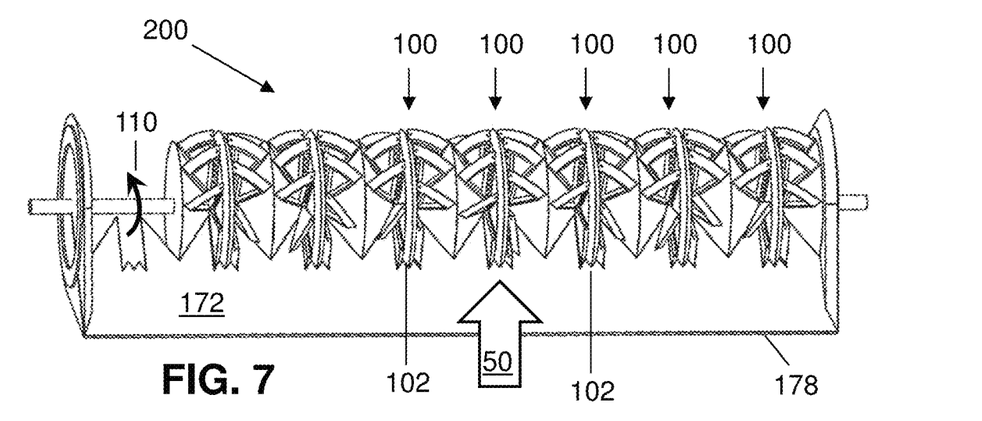
FIG. 7 is another perspective view of the shrouded flow conversion assembly as in FIG. 6.

The flow-prograde sides of the double turbines 100 rotating turbine stack are shown in FIG. 6 rotating out of notches 174 formed through a guide plate 172. The guide plate 172 guides the fluid flow 50 and by compressing it at an angle to the deflector discs 102 (FIG. 7), and intensifies the force of the flow hitting the beveled edges of the base plates and elevates the vanes quicker as they exit the notches 174 so that the power cycle begins sooner and the production range is increased, for example greater than 175 degrees. In at least one embodiment, the diversion shield 170 can be rotated to the appropriate angle of attack with a spur gear and feathering motor inside of each end bracket plate 180. FIG. 6-7 show a double turbine removed for clear illustration of at least the associated notch 174 through the radially inward edge of the guide plate 172.

Figure 8A:
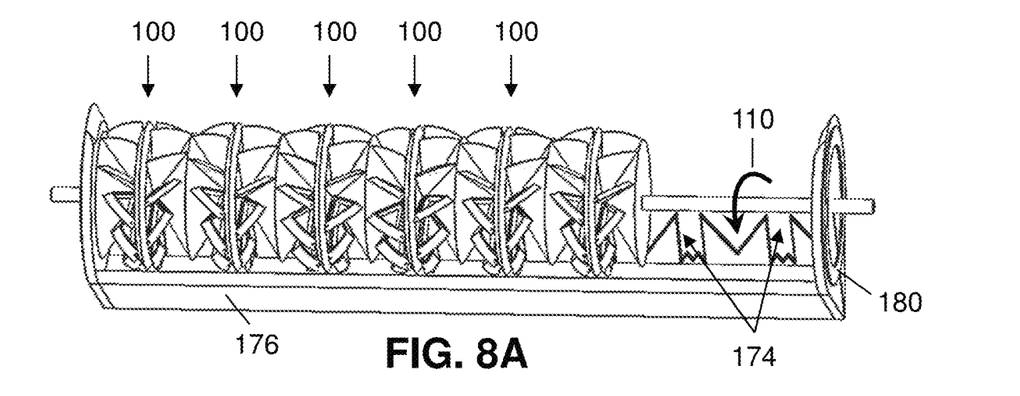
FIG. 8A is a perspective view of the shrouded flow conversion assembly of FIG. 5, taken opposite the perspective of FIG. 7 to show the flow-retrograde sides of the rotating turbine stack, and shown with two double turbines removed for illustration of the entry sides of the associated notches and external face of the support brace of the diversion shield.
Figure 8B:
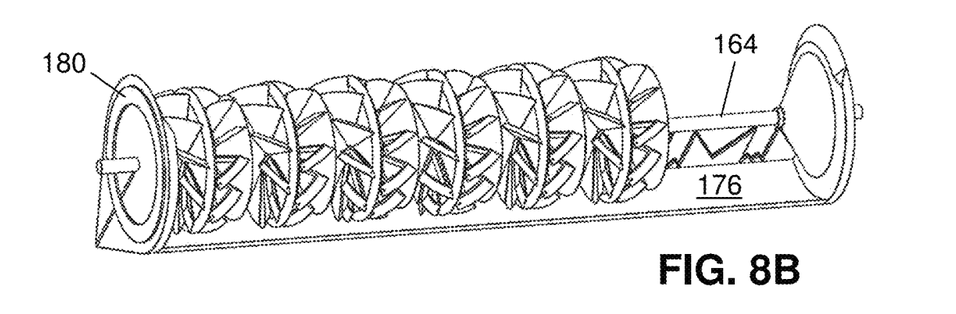
FIG. 8B is a perspective view of the shrouded flow conversion assembly of FIG. 8A, taken to show the arcuate internal face of the shield.

FIGS. 8A-B show the flow-retrograde side of the rotating turbine stack with two double turbines removed for illustration of the entry sides of the associated notches and external face of the shield of the support brace 176. FIG. 8B shows the arcuate internal face of the support brace. The linear junction of the guide plate 172 and support brace 176 generally defines the leading or bearing edge 178 of the shrouded flow conversion assembly first encountered by fluid flow.

Figure 9:
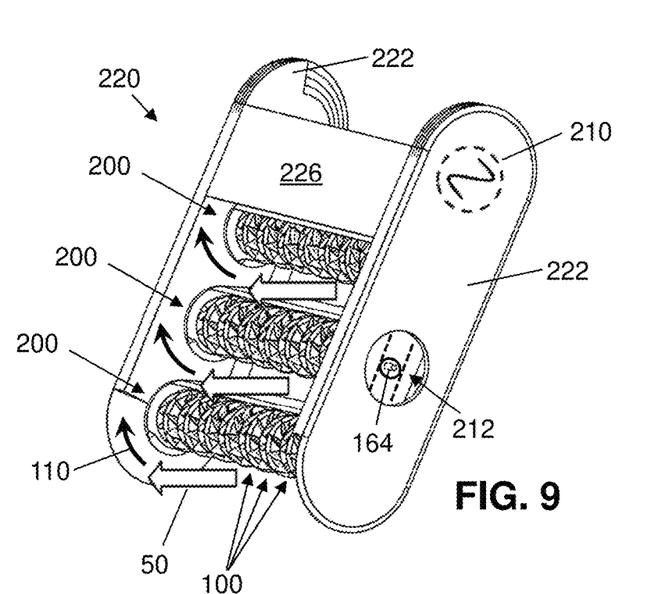
FIG. 9 is a perspective view of a multi-stage flow conversion assembly, according to at least one embodiment, having multiple illustrated shrouded flow conversion assemblies of FIG. 5 each defining a stage of flow conversion, and taken from a perspective to show the flow-retrograde sides of their rotating turbine stacks.

FIG. 9 is a perspective view of a multi-stage flow conversion assembly 220, according to at least one embodiment, having multiple illustrated shrouded flow conversion assemblies 200, for example each of the type shown in FIG. 5, and each defining a stage of flow conversion. Longitudinal ends of the flow conversion assemblies 200 are mounted on opposing spaced side plates 222 of the multi-stage flow conversion assembly 220, with the stack of double turbines of each flow conversion assembly 200 spanning the space between the side plates 222 to engage a fluid flow 50. A spanning connector brace 226 fixed at its opposing ends to the side plates 222 adds rigidity to the assembly 220.

Figure 10:
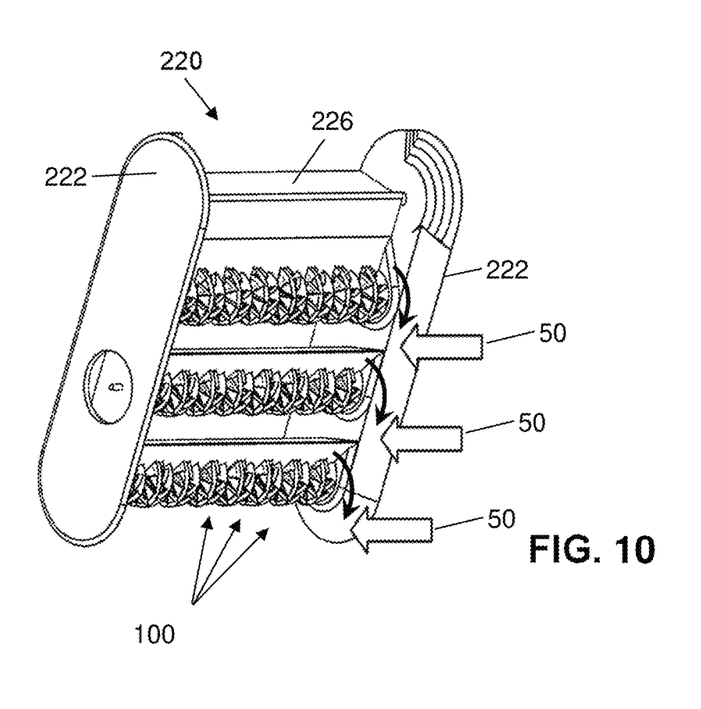
FIG. 10 is a perspective view of the multi-stage flow conversion assembly of FIG. 9, showing the flow-prograde sides of the rotating turbine stacks.

The flow-retrograde sides of the rotating turbine stacks are shown in FIG. 9, and the flow-prograde sides of the rotating turbine stacks are shown in FIG. 10. As in any stack, where double turbines 100 are preferentially arranged to naturally rotate in the same natural direction 110, the stacks are also arranged to naturally rotate in the same natural direction 110 among the conversion stages in FIGS. 9-10, each stage defined by a shrouded flow conversion assembly 200 with stacked turbines 100. The multi-stage flow conversion assembly 220 is illustrated as having three conversion stages. A multi-stage flow conversion assembly, of otherwise same or similar description as the assembly 220, can have any plural number of conversion stages. As non-limiting examples of utility, applying to all embodiments herein, mechanical linkage 212 (FIG. 9) can convey rotational mechanical energy to do work, for example to drive an electrical power generator 210 and/or electrical energy can be generated at each stage by respective generators 210.

Figure 11:
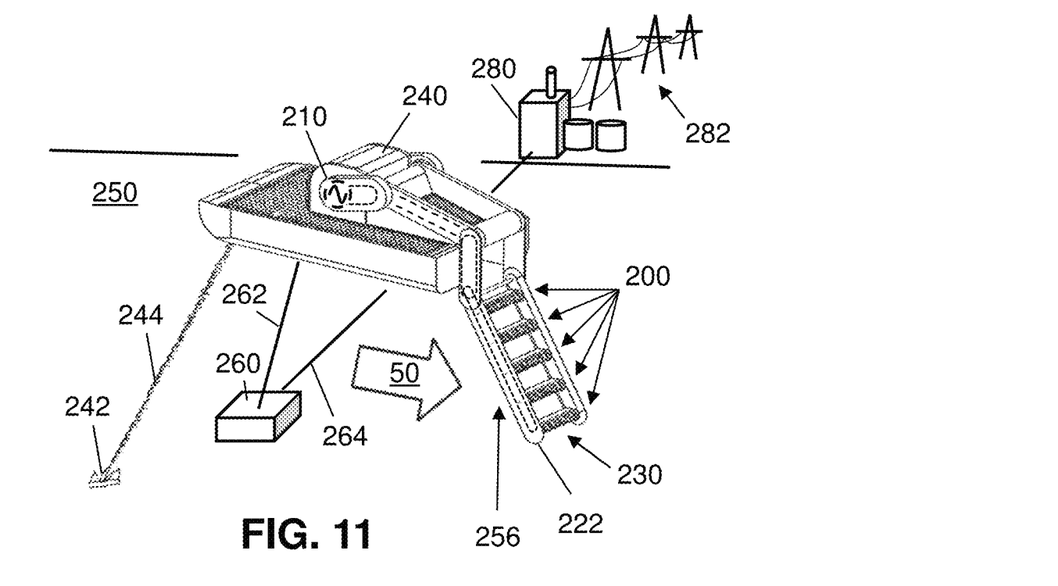
FIG. 11 is a perspective view of a fluid craft, according to at least one embodiment, at anchor in a flow environment and having a multi-stage flow conversion assembly in a deployed configuration.
Figure 12:
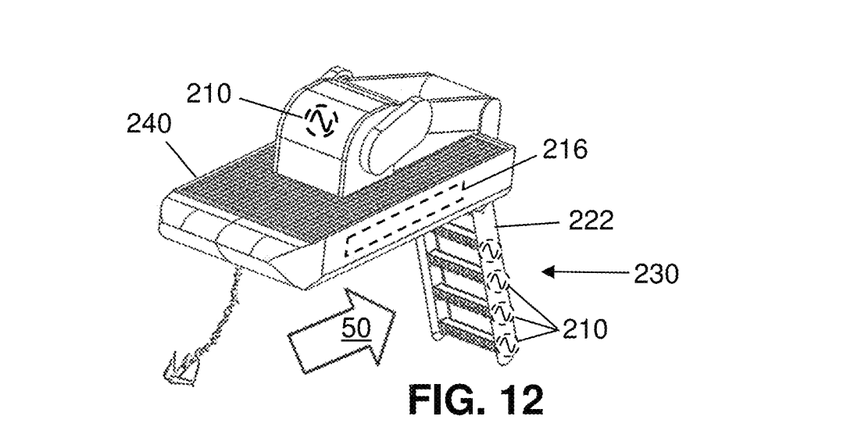
FIG. 12 is another perspective view of the fluid craft of FIG. 11.
Figure 13:
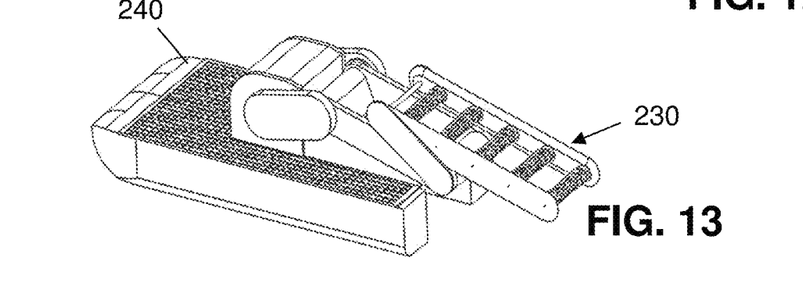
FIG. 13 is a perspective view of the fluid craft of FIG. 11, showing the multi-stage flow conversion assembly in a stowed configuration.

A multi-stage flow conversion assembly 230 (FIGS. 11-13), is shown as having five conversion stages. In an exemplary use and implementation of conversion assemblies and turbines as described herein, FIGS. 11-13 show a fluid craft 240, according to at least one embodiment, equipped with a stowable multi-stage flow conversion assembly 230. The fluid craft may be self-sufficient manned vehicle, and unmanned power-producing asset, in non-limiting examples. In FIGS. 11-12, the multi-stage flow conversion assembly 230 is shown as deployed and the craft 240 at anchor, for example in a body of water 250. By fixing the location of the craft 240 in a fluid flow 50, for example as shown by use of an anchor 242 and tensile line 244, and deploying the flow conversion assembly 230 into the fluid flow, translational kinetic energy can be harvested from the relative movement of the craft and surrounding fluid and converted to rotational kinetic energy by the double turbines, and the rotational kinetic energy can be converted to electrical energy by one or more generator 210. FIG. 13 shows the multi-stage flow conversion assembly in a stowed position upon the craft, for example to avoid drag as the craft travels, is transported, or is under harsh storm conditions.

The multi-stage flow conversion assembly 230 is shown to include five conversion stages as a non-limiting example, each stage defined by a respective flow conversion assembly, for example of the type shown in FIG. 5 as a shrouded flow conversion assembly 200 as a non-limiting example. Energy can be accumulated from the multiple illustrated double turbine stack stages. In a non-limiting example, mechanical linkage 256, shown in dashed line in FIG. 11 representing sprockets and drive chains or belts withing or along the deploy/stow support arms, can convey rotational mechanical energy from the conversion assembly 230 to the craft as harvested from the kinetic energy of the fluid flow movement by the conversion stages, and electrical power can be produced by an on-board generator 210, and stored or used by an on-board or off-board device 216. The device 216, in non-limiting examples, can be and/or include: a battery for storing electrical energy for use when needed; an electrically powered device such as the feathering motors inside the each end bracket plates 180 in some embodiments; and an on-board electrical appliance. FIG. 11 shows a sunken and/or anchored invertor 260, or other power transformer or conditioner, electrically coupled to the generator 210 by a first cable 262, and electrically coupled to other craft and/or a land-based facility 280 by one or more second cable 264 to carry generated current for use or power storage elsewhere. Alternatively and/or additionally, electrical power can be produced at each stage by respective generators 210 (FIG. 12) and conveyed to the craft for use, storage or further distribution.

According to various embodiments described above and illustrated in the drawings, a generator 210 coupled to one or more rotatable axle 164 is operative to generate electrical energy upon rotation of the axle. The generator is in electrical communication with at least one of a battery, an electrically powered device, and a facility 280 (FIG. 11) that utilizes, stores, and/or distributes the electrical energy such as by an electric power grid 282. When the above-described double turbines are disposed in a fluid flow 50 that engages the vanes 120 of the double turbines 100, rotation of the axle is caused by conversion of translational kinetic energy in the fluid flow into rotational kinetic energy in the axle, and further into electrical energy by a generator thereby reducing greenhouse emissions by clean energy conversion without fuel combustion and/or by reduced fuel combustion.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A double turbine comprising:
   a rotatable deflector disc including a first base plate and a second base plate facing opposing directions along an axis of rotation;
   a first plural number of first vanes each pivotally mounted on the first base plate and uniformly spaced around the axis of rotation by a vane spacing angle;
   a second plural number of second vanes each pivotally mounted on the second base plate, and uniformly spaced around the axis of rotation by the vane spacing angle, the second plural number being equivalent to the first plural number;
   wherein each first vane is angularly positioned with respect to the axis of rotation as between two second vanes, and each first vane freely pivots along a respective vane axis non-parallel to the axis of rotation, and each second vane freely pivots along a respective vane axis non-parallel to the axis of rotation.

2. The double turbine according to claim 1, wherein each first vane is angularly positioned with respect to the axis of rotation as halfway between two nearest second vanes.

3. The double turbine according to claim 1, wherein each first vane is angularly spaced with respect to the axis of rotation relative to at least one nearest second vane by a baseplate offset angle.

4. The double turbine according to claim 3, wherein the baseplate offset angle is equivalent to one half of the vane spacing angle.

5. The double turbine according to claim 1, each first vane freely pivots relative to the first base plate, and each second vane freely pivots relative to the second base plate.

6. The double turbine according to claim 1, wherein each first vane freely pivots along a respective vane axis perpendicular to the axis of rotation.

7. The double turbine according to claim 6, wherein the vane axis of each second vane is perpendicular to the axis of rotation, and the vane axis of each first vane and each second vane is offset from the axis of rotation.

8. The double turbine according to claim 6, each vane axis is prograde positioned and retrograde rotated relative to a respective radial line through the axis of rotation.

9. The double turbine according to claim 1, wherein:
   each first vane pivots between the first base plate and an acute raised angle therefrom; and
   each second vane pivots between the second base plate and an acute raised angle therefrom.

10. The double turbine according to claim 9, wherein:
    each first vane has a cupped aft face directed opposite the direction of rotation of the double turbine when in a raised pivot position; and
    each second vane has a cupped aft face directed opposite the direction of rotation of the double turbine when in a raised pivot position.

11. A conversion assembly comprising a particular number of multiple double turbines arranged along a shared axis of rotation, each double turbine respectively comprising:
    a rotatable deflector disc including a first base plate and a second base plate facing opposing directions along the axis of rotation;
    a first plural number of first vanes each pivotally mounted on the first base plate and uniformly spaced around the axis of rotation by a vane spacing angle;
    a second plural number of second vanes each pivotally mounted on the second base plate, and uniformly spaced around the axis of rotation by the vane spacing angle, the second plural number being equivalent to the first plural number; and
    wherein each first vane is angularly positioned with respect to the axis of rotation as between two second vanes,
    wherein the multiple double turbines are arranged with a progressive helical twist such that each double turbine is offset from at least one adjacent double turbine by a common twist angle with respect to the axis of rotation.

12. A conversion assembly according to claim 11, wherein, within each double turbine, each first vane is angularly positioned with respect to the axis of rotation as halfway between two nearest second vanes.

13. A conversion assembly according to claim 11, wherein, within each double turbine, each first vane is angularly spaced with respect to the axis of rotation relative to at least one nearest second vane by a baseplate offset angle.

14. A conversion assembly according to claim 13, wherein each double turbine of the particular number of double turbines has the same baseplate offset angle.

15. A conversion assembly according to claim 14, wherein the common twist angle is equivalent to the baseplate offset angle divided by the particular number.

16. A conversion assembly according to claim 15, wherein:
each double turbine has the same number of first vanes and second vanes as each other double turbine such that each double turbine has the same vane spacing angle.

17. A conversion assembly according to claim 15, wherein the baseplate offset angle is equivalent to one half of the vane spacing angle.

18. A conversion assembly comprising multiple stacks of double turbines, each stack comprising the particular number of multiple double turbines according to claim 11.

19. A conversion assembly for converting kinetic energy in a fluid flow to electrical energy, the conversion assembly comprising:
a particular number of multiple double turbines mounted along a shared rotatable axle defining an axis of rotation, each double turbine respectively comprising:
a rotatable deflector disc mounted on the shared rotatable axle, the rotatable deflector disc including a first base plate and a second base plate facing opposing directions along the axis of rotation;
a first plural number of first vanes each pivotally mounted on the first base plate and uniformly spaced around the axis of rotation by a vane spacing angle;
a second plural number of second vanes each pivotally mounted on the second base plate, and uniformly spaced around the axis of rotation by the vane spacing angle, the second plural number being equivalent to the first plural number; and
wherein each first vane is angularly positioned with respect to the axis of rotation as between two second vanes,
wherein the multiple double turbines are arranged with a progressive helical twist such that each double turbine is offset from at least one adjacent double turbine by a common twist angle with respect to the axis of rotation; and
a generator coupled to the shared rotatable axle and operative to generate electrical energy upon rotation of the axle, the generator in electrical communication with at least one of a battery, an electrically powered device, and a land-based facility;
wherein at least the multiple double turbines are disposed in a fluid flow engaging the first vanes and the second vanes of each double turbine causing rotation of the axle and conversion of kinetic energy in the fluid flow into electrical energy by the generator.

* * * * *